April 7, 1953 N. A. NELSON 2,633,787
REVERSIBLE AGRICULTURAL IMPLEMENT
Filed April 5, 1949 8 Sheets-Sheet 1

INVENTOR.
NORAL A. NELSON
BY W. M. Alexander
& E. J. Nerlich
ATTORNEYS

April 7, 1953           N. A. NELSON           2,633,787

REVERSIBLE AGRICULTURAL IMPLEMENT

Filed April 5, 1949           8 Sheets-Sheet 5

INVENTOR.
NORAL A. NELSON

April 7, 1953 N. A. NELSON 2,633,787
REVERSIBLE AGRICULTURAL IMPLEMENT
Filed April 5, 1949 8 Sheets-Sheet 7

INVENTOR.
NORAL A. NELSON
BY N. M. Alexander
& E. J. Werlich
ATTORNEYS

Patented Apr. 7, 1953

2,633,787

UNITED STATES PATENT OFFICE 2,633,787

REVERSIBLE AGRICULTURAL IMPLEMENT

Noral A. Nelson, Royal Oak, Mich., assignor to Harry Ferguson, Inc., Detroit, Mich., a corporation of Delaware Application April 5, 1949, Serial No. 85,646

26 Claims. (Cl. 97—26)

1

The invention relates to implements adapted for two different conditions or manners of operation, for example, implements having soil-engaging tools of two different forms adapted for operation alternately. Such implements may if desired be adapted for direct attachment to tractors. The invention finds especial utility in soil-preparing implements such as two-way plows, and by way of illustration has been shown as embodied in an implement of that type.

A general object of the invention is to provide an improved implement of the above general character which can be quickly and easily attached to a tractor equipped with a conventional power-actuated lift and in which the action of the lift is utilized in a novel manner for alternately adjusting the implement to two different manners or conditions of operation. The implement may have a plurality of soil-engaging tools alternately positioned for operation by the tractor lift.

While the improved implement may be associated with a tractor equipped with any suitable power-lift mechanism, it is particularly well adapted for use with tractors equipped with the well-known "Ferguson System" as disclosed, for example, in the Ferguson U. S. Patent No. 2,118,180, issued May 24, 1938. This system includes a pair of hydraulically-actuated lower links for attachment to an implement and operable to swing the implement between working and transport positions. The system also includes controls for the hydraulic actuator whereby the draft load on the links is maintained uniform at all times.

Another object of the invention is to provide new and improved means for effecting the positioning of the dual soil-engaging tools of the implement for operation alternately as an incident to the lifting of the implement from working to transport position while retaining the uniform draft load characteristics of the system with either tool in operation.

A more specific object is to provide a new and improved two-way plow attachment for tractors equipped with the "Ferguson System" linkage, including right and left-hand plow units adapted to be positioned alternately for operation, wherein such positioning is effected by the action of the lift mechanism in swinging the plow to transport position.

Another object is to provide an improved two-way implement in which a novel change-over mechanism is arranged to shift ground-working tools alternately into operative and inoperative position by a rocking or oscillatory movement about a generally longitudinal axis of the imple-

2 ment, the change-over mechanism being actuated by the vertical movement of tractor hitch or lift-links connecting the implement and the tractor, and the tools having such angular relationship to each other that the weight of the inoperative tool is used to great advantage in assisting the force applied by the change-over mechanism at the start of the change-over movement.

It is also an object of the invention to provide a two-way plow with a single rolling coulter adapted to be adjusted automatically for proper operation with either plow unit as an incident to the shifting of the respective plow units into operative positions.

A further object is to provide mechanism for effecting the shifting of two soil-engaging tools of a soil-working implement into operative position alternately, which mechanism is extremely simple in construction yet efficient and positive in operation, and which may be quickly and easily rendered inactive when it is desired to use only one of the tools.

The invention also resides in the novel combinations and correlation of the various elements of the implement and their relationship to the elements of the lift mechanism of the tractor, which together with other objects and advantages of the invention will become apparent from the following detailed description of the preferred embodiment illustrated in the accompanying drawings, in which:

Referring more particularly to the drawings (see Figs. 1-7), it will be perceived that the invention has been illustrated as embodied in a single bottom two-way plow adapted for attachment to what is a more or less standard form of tractor. Although the invention resides, in certain of its aspects, in a two-way plow as such, the invention is applicable in its broader aspects to other implements having two soil-working tools of different form. Accordingly, there is no intention to limit the invention to the particular embodiment shown, but on the contrary the intention is to cover all modifications, alternative uses and constructions falling within the spirit and scope of the invention as expressed in the appended claims.

*The tractor and associated parts*

Figure 1:
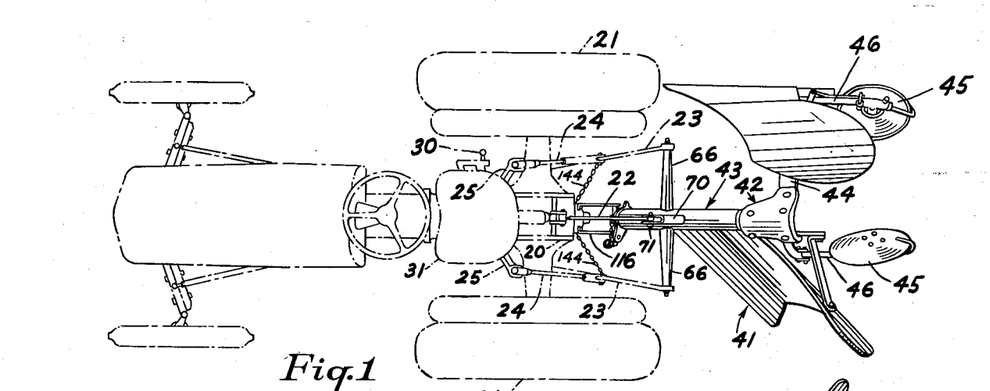
Figure 1 is a plan view of a tractor equipped with a two-way plow attachment embodying the features of the invention.
Figure 2:
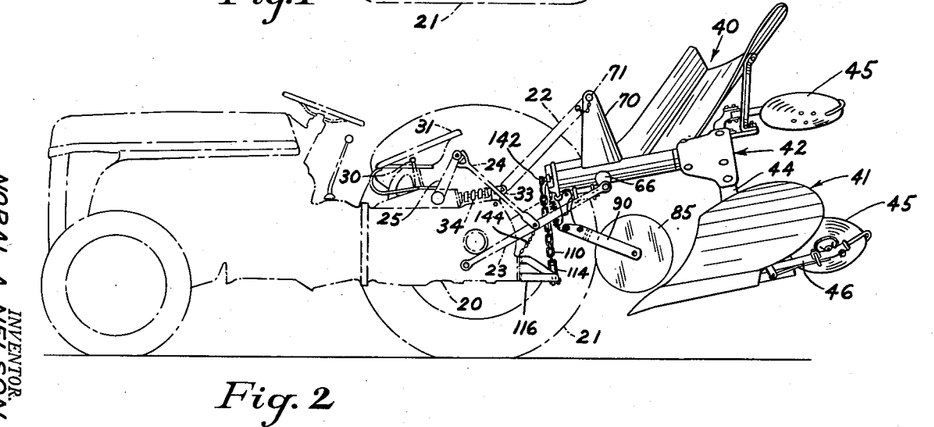
Fig. 2 is a side elevation of the tractor and plow attachment showing the latter in raised or transport position, the near rear wheel of the tractor being omitted to expose the attachment more fully.
Figure 3:
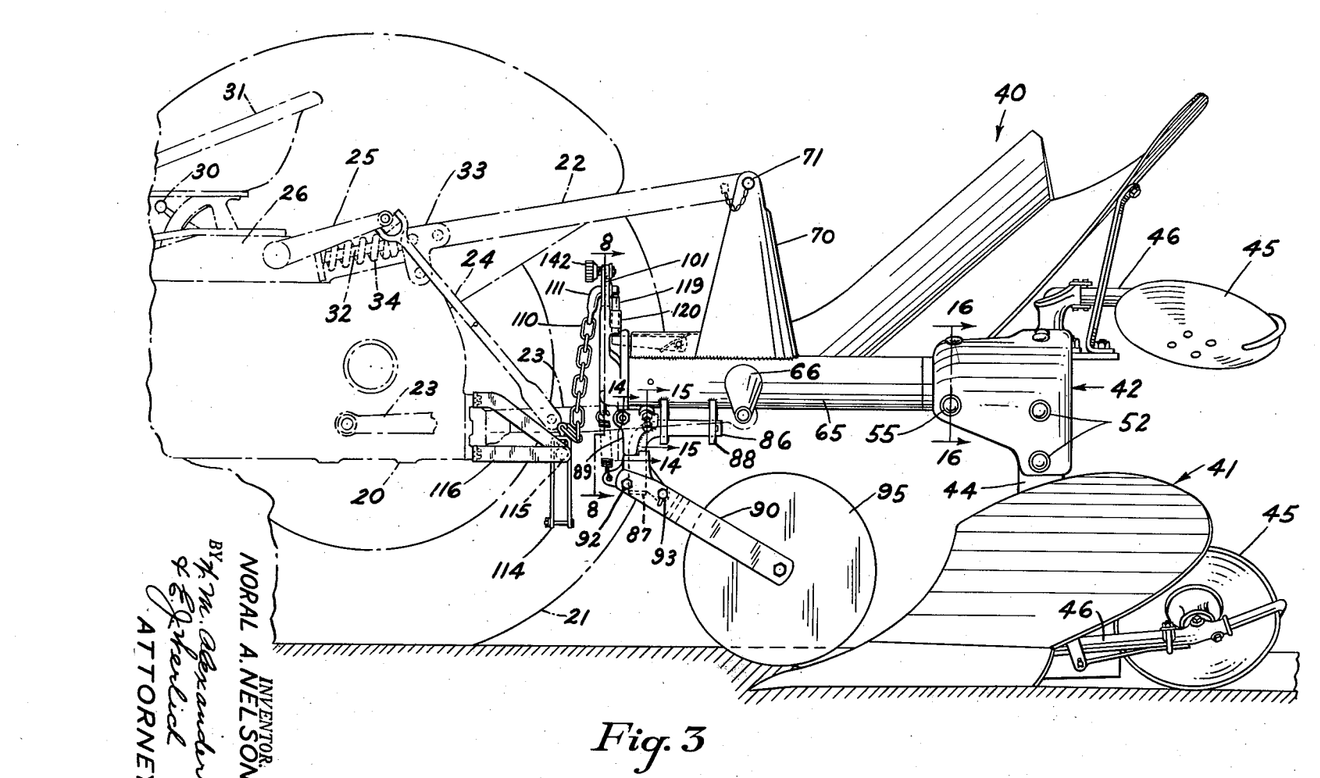
Fig. 3 is a fragmentary side elevation generally similar to Fig. 2, but showing the plow attachment in a lowered or operating position and the left-hand plow unit positioned for operation.

Referring now to Figs. 1-3 of the drawings, the tractor shown has a rigid body casing 20 supported between the usual rear ground wheels 21 and is equipped with the linkage and implement control system generally known as the "Ferguson System." The linkage includes an upper compression link 22 and a pair of laterally spaced draft or hitch links 23. The latter are pivoted in trailing relation on a rigid portion of the tractor frame, in this instance on the body casing 20. The hitch links 22 are suspended by links 24 from power-operated cranks 25 to swing vertically in unison. The power means for actuating the cranks 25 is preferably of the hydraulic ram type largely supported along with its associated control instrumentalities by a housing 26 mounted on the top of the casing 20. The construction and mode of operation of this linkage or lift mechanism is fully disclosed in the Ferguson U. S. patent mentioned above. For present purposes it is only necessary to state that the admission of pressure fluid to the actuating ram serves to raise the cranks 25 and hitch links 23, while relief of pressure permits the cranks and links to descend by gravity.

Provision is normally made in the "Ferguson System" for both manual and automatic control of the admission to and exhaust of pressure fluid from the ram. For manual control purposes a hand lever 30 adjacent the operator's seat 31 is shifted to actuate a control valve (not shown) to raise and lower the links 23 between working and transport positions, shown respectively in Figs. 3 and 2. For automatic control purposes, a control rod 32 (Fig. 3) is arranged to operate the above-mentioned control valve, as explained in detail in the Ferguson patent. Inward movement of the control rod is imparted by thrust applied through the compression link 22 to an angle lever or shackle 33 and resisted by a control spring 34. Such thrust is applied from the implement so that the hitch or linkage will be raised or lowered in obedience to variations in draft load exerted by the implement. Under an excess draft load the control rod 32 is thrust still further forward, shifting the valve mechanism to a position to completely exhaust the pressure fluid from the hydraulic ram. As a result the load of the implement is released from the rear wheels of the tractor, allowing them to spin harmlessly, the latter feature being covered in the Ferguson U. S. Patent No. 2,118,181, issued May 24, 1938.

*Plow structure*

The exemplary plow includes right and left-hand plow units or bases 40 and 41 carried by a rotatable or rockable plow beam assembly 42 which is supported on a housing 43 adapted to be connected with the tractor through the medium of the "Ferguson System" linkage, as will appear presently. The assembly 42 is common to both bases and has rigidly attached thereto right- and left-hand beam sections 44 to project radially with respect to the rotational axis of the beam assembly. Each base, in addition to including a suitable plow base, has a furrow wheel or running landside 45. Preferably the furrow wheel is of the type disclosed in Ferguson Patent No. 2,195,515 and briefly includes a bracket 46 projecting rearwardly from the plow base and pivotally supported (Fig. 7) on a post 47 carried by the plow base so that the furrow wheel is adapted to rock in a plane generally vertical and parallel to the landside of the plow base. A heavy leafspring 48 yieldably urges the bracket in a direction to maintain the furrow wheel in a ground-engaging position.

Figure 4:
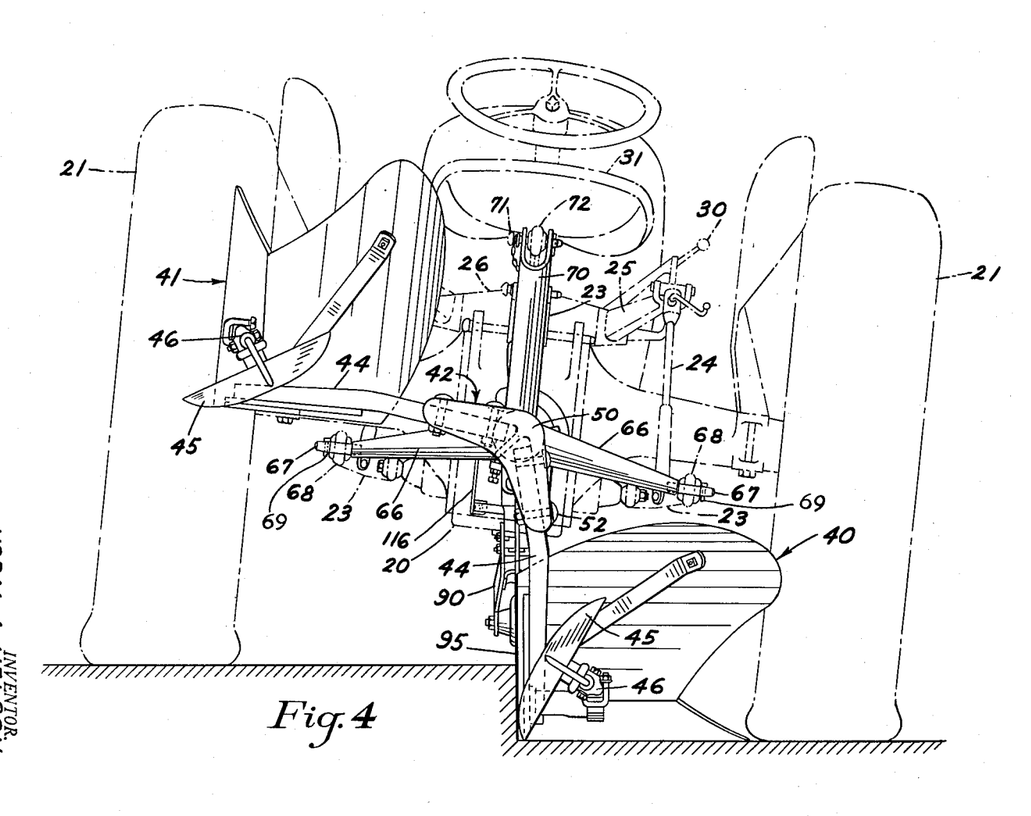
Fig. 4 is a rear view of the tractor and plow attachment showing the right-hand plow unit positioned for operation.

To provide for operation of the plow bases individually and alternately, the beam sections 44 are angularly spaced apart with respect to the axis of the common beam 42, the spacing preferably being on the order of ninety degrees so that the plow units may be shifted into operative positions selectively by approximately a quarter turn of the beam. As shown in Fig. 4, each of the sections 44 has a slight lateral bend intermediate its ends and its lower end portion is formed with a small forward curvature (see Figs. 4 and 5) to receive the base and support it from the common beam assembly 42 in proper operating relation to the ground.

Figure 6:
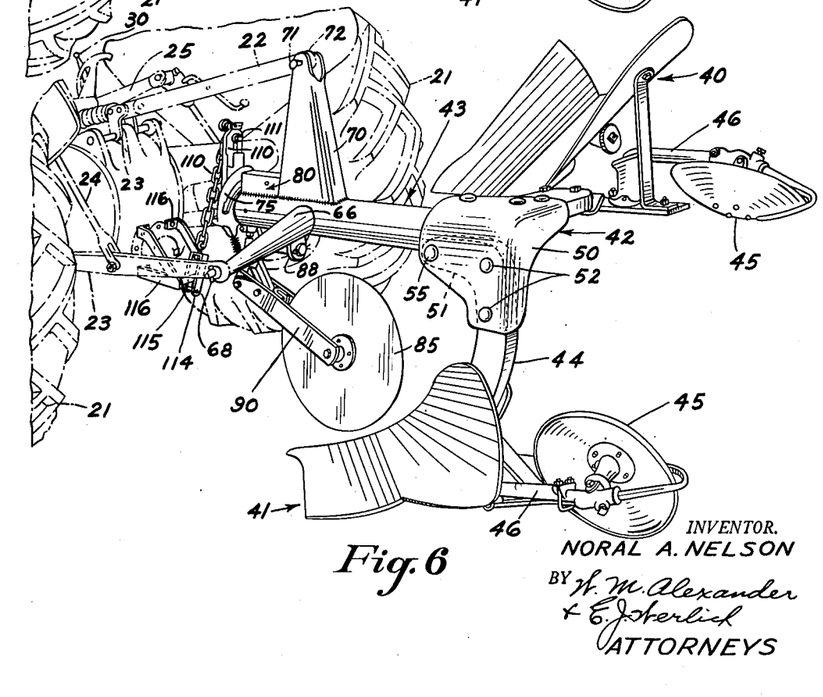
Fig. 6 is a fragmentary perspective view similar to Fig. 5, but showing the plow attachment lowered sufficiently to allow the left-hand plow unit to rest on the ground.

The attachment of the beam sections 44 to the plow beam assembly 42 is made rigid by an angular head 50. The head 50, which may conveniently comprise a steel casting, is formed with two right-angularly disposed lateral flanges shaped at their inner faces to provide bearing seats for the beam sections 44. Preferably each upper end portion is extended forwardly as at 51 (Fig. 6) to provide for attachment of the beam sections at three triangularly related points for greater strength and rigidity. For adjustably attaching each beam section 44 to the head 50 so that the associated plow base may be lined up accurately from front to rear, the body portion of each beam section adjacent the extension 51 is, as shown in Figs. 4 and 6, securely anchored to the head flange by two bolts 52. The extension 51, however, is bent at a slight angle to the plane of the beam section and is provided with adjustable bearing means for cooperation with the bearing seat in the head 50.

Figures 13, 14, 15, 16:
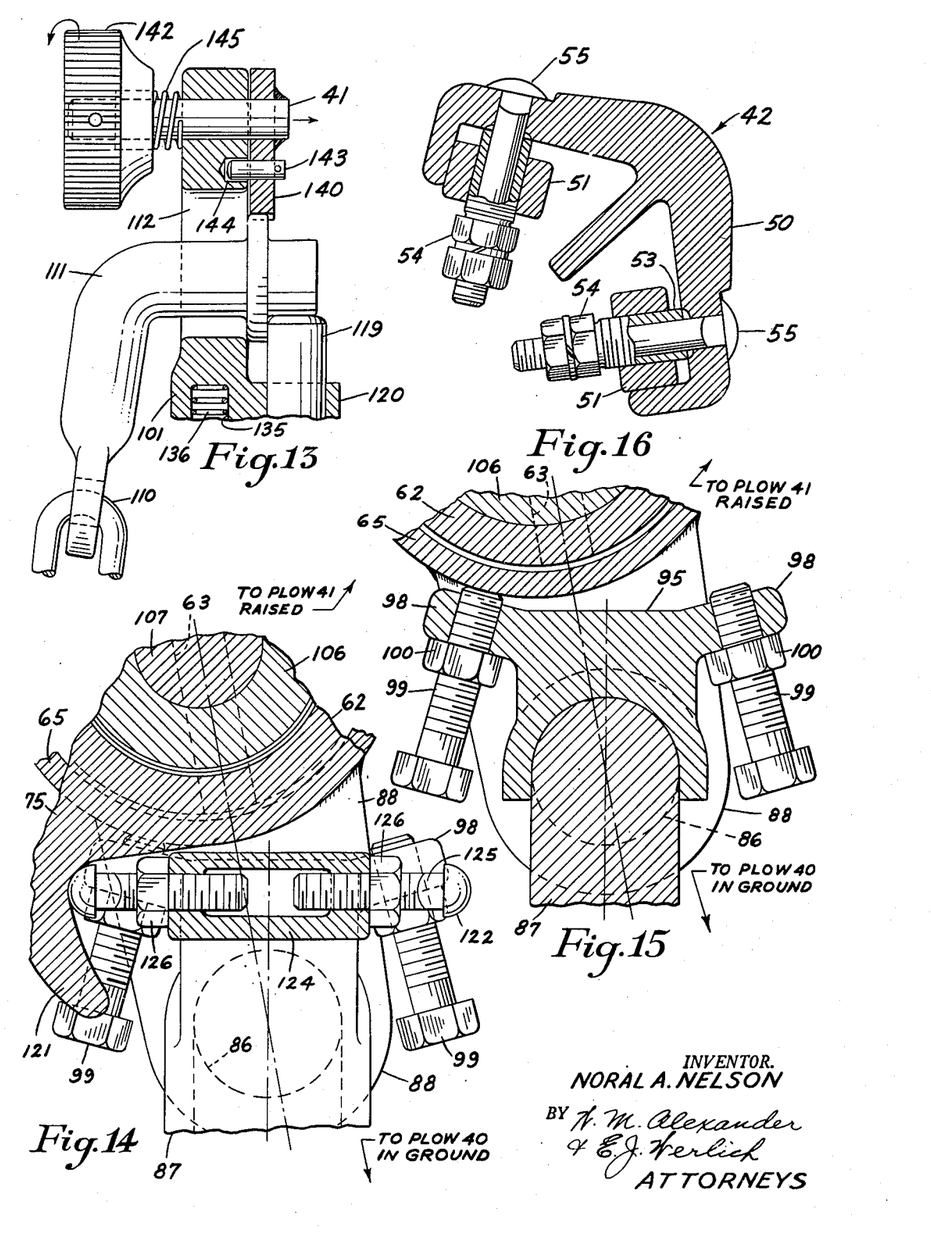
Fig. 13 is a fragmentary sectional view taken in a plane substantially on the line 13—13 of Fig. 12.
Fig. 14 is a fragmentary sectional view taken in a vertical plane substantially on the line 14—14 of Fig. 3.
Fig. 15 is a fragmentary sectional view taken in a vertical plane substantially on the line 15—15 of Fig. 3.
Fig. 16 is a fragmentary sectional view taken in a vertical plane substantially on the line 16—16 of Fig. 3.

The adjustable bearing means as shown in Fig. 16 comprises a tubular element 53 threaded into an aperture in the extension and dimensioned so as to project at opposite sides thereof. The inner end of the element presents a bearing surface spaced from the side of the extension for engagement with the inner face of the head 50. By screwing the element 53 in or out, the beam section 44 may be adjusted about a longitudinal axis, thereby similarly varying the position of the plow base. The outer end of the element 53 is formed with a hexagonal wrench-engaging portion 54 by which it may be turned to effect such adjustments. Suitable locking means, such as bolts 55, are utilized to anchor the bearing elements to the head 50. It will be understood, of course, that the anchor bolts 52 are finally tightened only after the necessary adjustment of the bearing elements 53 have been made.

To provide for rotatably supporting the plow beam assembly 42 in the housing 43, the beam assembly includes an elongated shaft 60 (Fig. 9) to the outer end of which the head 50, which at this point is generally cylindrical in form, is secured as by welding. Preferably the shaft 60 is hollow or tubular in form and the head 50 is conveniently provided with a centering projection 61 fitting into the shaft to accurately locate the head with respect thereto in the assembly of the beam. The other end of the shaft 60 is reduced in diameter to receive a sleeve-like bearing and locking element 62 which is nonrotatably secured to the shaft by a cross pin 63.

The housing 43 (Fig. 9) comprises an elongated tubular shell 65 having internal annular bearing surfaces at opposite ends for engagement with complemental bearing surfaces on the head 50 and element 62. The plow beam assembly 42 is thus supported for rotation about the longitudinal axis of the shaft 60.

Welded or otherwise secured to and projecting laterally from opposite sides of the shell 65 are a pair of rigid arms 66 (Figs. 1 and 4) by which the housing is operatively connected with the hitch links 23 of the tractor lift. The arms 66 as shown are tubular in construction, tapering toward their outer ends and terminating in studs or pin-like ends 67 receivable in ball-and-socket elements 68 carried on the trailing ends of the links 23. Linchpins 69 inserted through the projecting ends of the studs retain the assemblies while permitting convenient disconnection when the implement is to be disengaged from the tractor.

Figure 5:
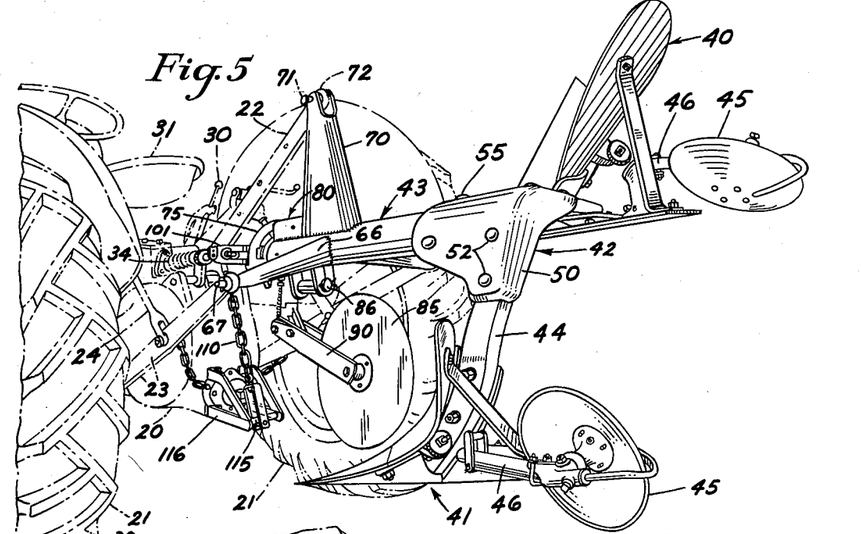
Fig. 5 is a fragmentary perspective view of the tractor and plow attachment as viewed from the rear, the attachment being shown in raised or transport position.
Figures 9, 10:
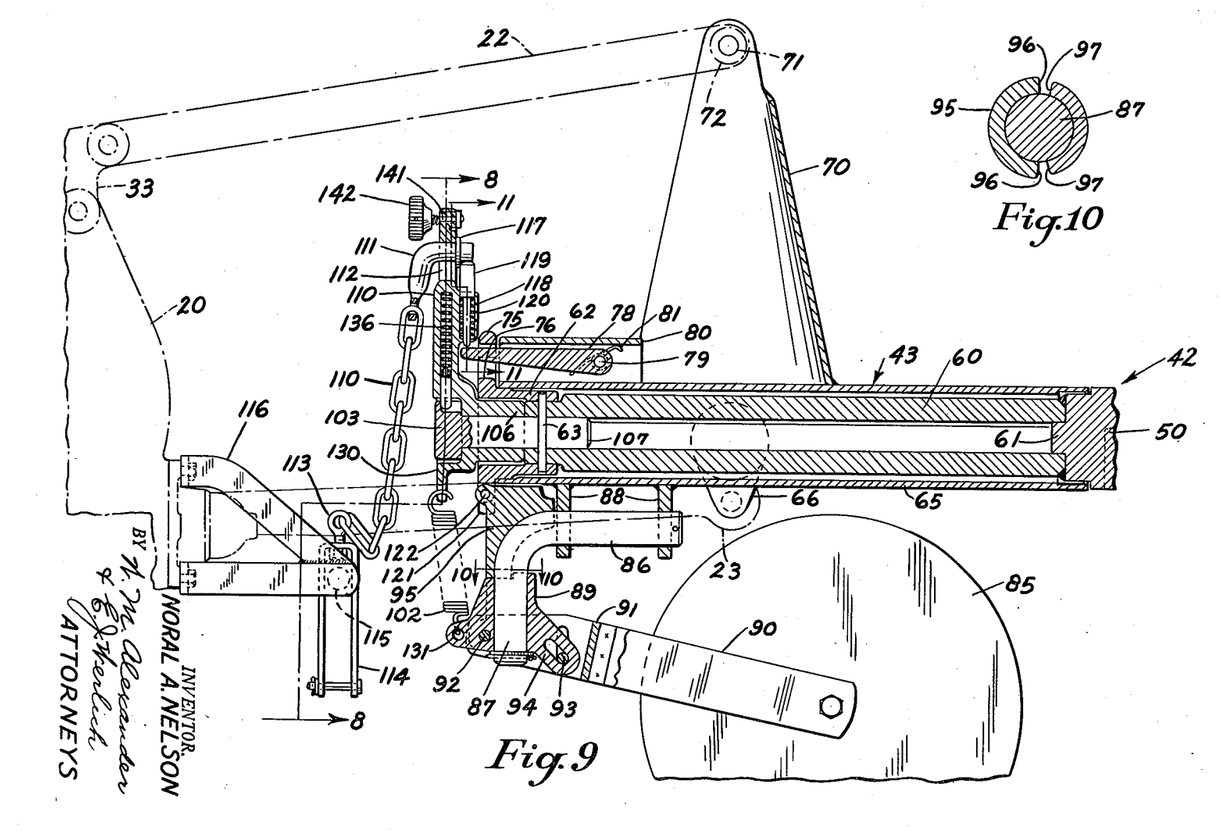
Fig. 9 is a sectional view taken in a vertical plane substantially on the line 9—9 of Fig. 8.
Fig. 10 is a sectional view taken in a horizontal plane substantially on the line 10—10 of Fig. 9.

Projecting upwardly from the housing shell 65 approximately midway between the arms 66 is a rigid strut 70 for connection with the compression link 22 of the hitch. As shown in Figs. 4, 5 and 9, the strut is constructed of heavy sheet metal and has tapering side walls spaced apart to receive the link 22 between them. Connection of the link to the strut is effected by a pivot pin 71 projecting through the spaced strut walls and through a ball-and-socket element 72 carried by the link 22. The three-point connection provided by the links 22 and 23 with the strut 70 and arms 66 holds the housing 43 against rotation and insures proper trailing of the plow behind the tractor at all times.

While the plow beam assembly 42 is rotatable within the housing 43 for selection of the plow units 40 and 41, provision is made for releasably locking it against rotation after either plow unit has been swung into operative position and while the selected plow unit is operating. Means is also provided for unlocking the beam assembly so that it can be rotated for changing over the plow units.

In the exemplary plow structure, the locking and bearing element 62 is formed with an upstanding segmental flange 75 (Figs. 8, 9 and 11) having an arcuate slot 76 with upwardly directed recesses 77 (see Fig. 11) at opposite ends for the reception of a locking detent 78. The detent 78 (Fig. 9) is in the form of an elongated lever arm having its free end projecting into the slot 76 and pivotally supported at its other end by a pin 79 within a hollow bracket 80 welded or otherwise secured to the top of the housing shell 65. A spring 81 (Fig. 9) urges the free end of the detent upwardly into one or the other of the recesses 77 when the respective plow units are swung into operative position. The engagement of the detent in either recess effectually locks the plow beam assembly against rotation, thereby guarding against accidental displacement of a plow unit while in operation. When the plow units are to be changed, the detent is withdrawn by mechanism to be described hereinafter.

*Rolling coulter and supporting structure*

The improved plow is provided with a single rolling coulter 85 supported in a novel manner which permits it to be adjusted to the proper angle for operation with either the right or left-hand plow unit. To provide for such adjustment, the coulter is mounted for limited bodily swinging movement on an axis disposed transversely to its own rotational axis and substantially parallel to the axis of the plow beam.

In the exemplary structure shown best in Fig. 9 the support for the coulter 85 is provided by a shaft having two right-angularly disposed sections including a horizontal section 86 and a vertical section 87. The horizontal section 86 is journaled in spaced bearing plates 88 rigid with and depending from the underside of the housing shell 65. Rotatably supported, as by a split-ring assembly, on the vertical shaft section 87 is a bracket 89 carrying a fork member 90 between the trailing ends of which the coulter 85 is journaled. The fork member 90 may be formed of a pair of spaced parallel side bars rigidly connected intermediate their ends by a cross member 91. At their forward ends the bars straddle the bracket 89 and are secured thereto by a pivot pin 92 to permit adjustment of the member for varying the cutting depth of the coulter. In operation the coulter fork is locked in adjusted position by a clamping bolt 93 extending through registering slots in the side bars of the fork and through an arm 94 integral with and projecting rearwardly from the bracket 89.

Provision is made for confining the swinging movement of the coulter about the axis of the shaft section 86 within predetermined limits. Provision is also made for restricting the pivotal movement of the coulter about the axis of the shaft section 87 to a range sufficient to allow it to swing into a proper operating plane with respect to either base. For this purpose an abutment block 95 is welded or otherwise secured to the coulter supporting shaft at its intermediate or curved section between the sections 86 and 87. The block has a depending portion adapted to abut the upper face of the bracket 89 which is recessed for its accommodation as shown in Fig. 9, thus defining cooperating fixed and movable stop shoulders 96 and 97 as shown in Fig. 10. The spacing of the stop shoulders is such that the pivotal movement is confined to a relatively small angle (as, for example, 10° on either side of a centered position).

For limiting the swinging movement of the coulter about the axis of the shaft section 86, the abutment block 95 is formed at its upper edge with oppositely projecting lateral flanges 98 (Fig. 15) threaded for the reception of stop screws 99. The stop screws have their inner ends positioned for engagement with the housing shell 65 and thus define the two limit positions to which the coulter may swing about a horizontal axis. Each limit position may be adjusted as required with respect to each base by turning the screws in or out and suitable means, such as lock nuts 100, are provided for retaining the screws in adjusted positions.

*Plow unit and coulter selecting and actuating mechanism*

In accordance with the invention the shifting of the soil-engaging tools or plow units to position them alternately for operation is effected by the simple expedient of lifting the implement bodily to a raised or transport position. This lifting is effected by the "Ferguson System" linkage in well known manner upon admission of pressure fluid to the hydraulic ram of the system. The lifting action initially releases the lock for the common tool-supporting beam assembly and subsequently rotates the beam in the proper direction to swing the previously operative tool into an inactive position and the companion tool to the operative position, the swinging movement being timed to guard against a premature movement of the tools. As an incident to the selective positioning of one of the plow units, the angle of the coulter 85 is automatically adjusted for operation with the plow unit to become operative. When the implement is lowered to the working position the mechanism for effecting the foregoing operations is set to predispose the plow assembly for reverse movement during the next cycle of operation.

The mechanism for changing over the plow units and for adjusting the coulter 85 includes an actuator lever 101 (Figs. 8 and 9) supported on the plow structure for rocking movement and yieldably urged to one or another of its two initial or starting positions by a spring 102. Through the medium of a lost-motion connection with a stationary part of the tractor structure, the plow beam is unlocked and the actuator is rocked to the opposite position when the plow structure is raised to transport position. In other words, the arrangement is such that the actuator lever is effective to position the right and left plow units for operation alternately by successive rocking movements in opposite directions. The directions of such movements are determined by a selector cam 103 to be discussed hereinafter.

Figures 7, 8, 11, 12:
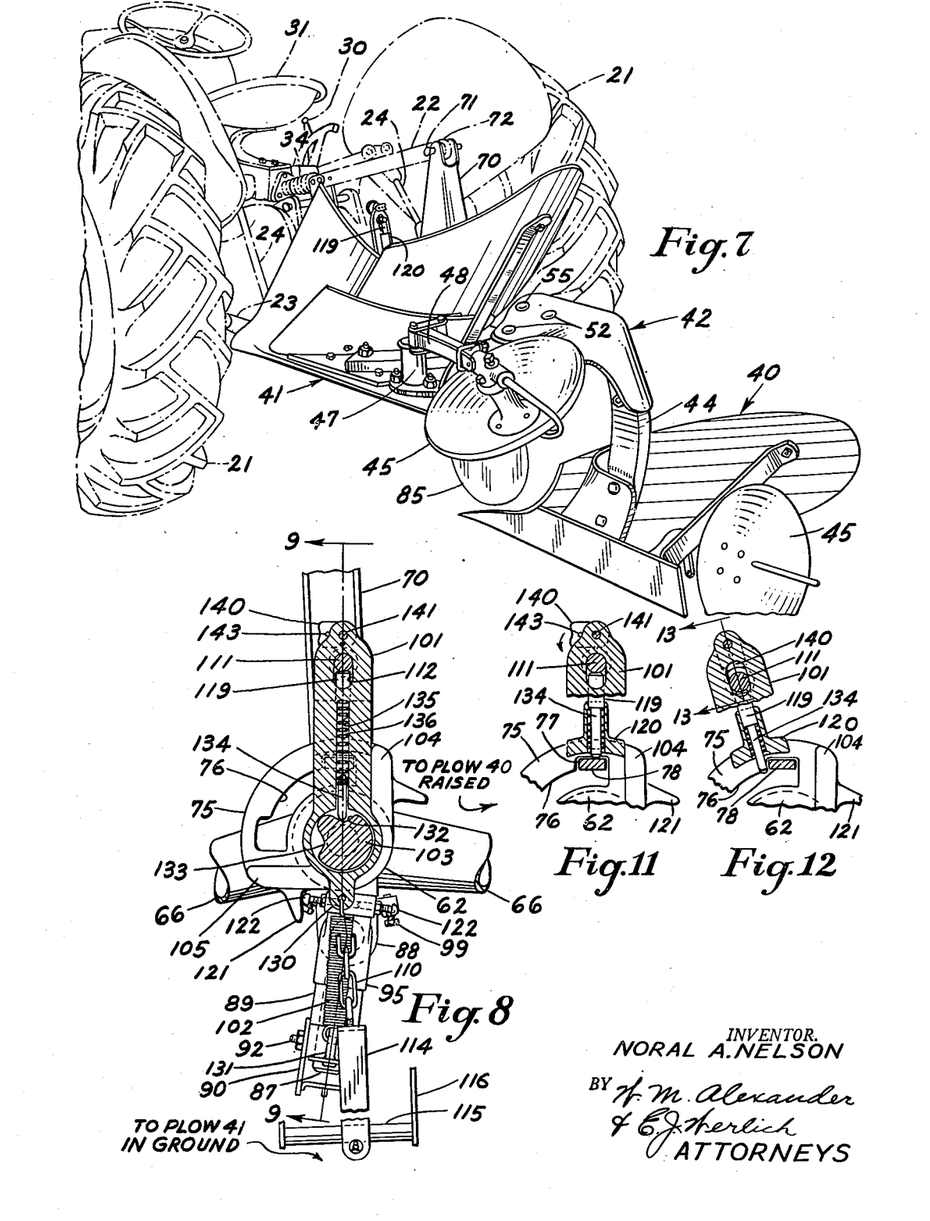
Fig. 7 is a fragmentary perspective view similar to the preceding figure showing the right-hand plow unit resting on the ground.
Fig. 8 is a detail sectional view taken in a vertical plane substantially on the line 8—8 of Fig. 3.
Fig. 11 is a fragmentary sectional view taken in the same plane as Fig. 8, but with a part of the actuator lever broken away to show details of the lock and lock-disengaging mechanism.
Fig. 12 is a fragmentary sectional view similar to Fig. 11, but showing the lock-disengaging mechanism latched in an inactive position.

As shown in Fig. 8, the rocking movements of the actuator lever 101 are imparted to the plow beam assembly 42 through the medium of spaced abutments 104 and 105 formed on or rigid with the forward end face of the bearing and locking element 62 for engagement by the opposite side faces of lever 101. Rotational movements of the beam in turn are transmitted to the coulter structure to adjust it and this adjustment is utilized to condition the spring 102 to return the actuator to starting position and in cooperation with the selector cam 103 to insure rocking of the actuator in the desired direction in the next operating cycle.

In the exemplary plow structure, the actuator 101 is formed at one end with a tubular hub 106 dimensioned to fit loosely in the forward end of the locking and bearing element 62 so that the actuator extends across the face of the flange 75 of the element as shown in Figs. 8 and 9. The face portion of the actuator adjacent the hub 106 is recessed for the reception of the cam 103 which comprises an enlarged head having a shank portion 107 projecting through the hub 106 and into the tubular shaft 60 to which it is nonrotatably fixed by the cross pin 63. The shank 107 of the cam thus provides a bearing support for the actuator lever and the cam itself serves to retain the lever in place.

The connection between the actuator 101 and the stationary part of the tractor includes a flexible member 110, such as a chain. As shown in Fig. 9, the chain is secured at one end to one leg of an L-shaped anchoring member 111, the other leg of the member extending through and being secured for sliding movement in a longitudinal slot 112 formed in the actuator adjacent its free end. At its other end the chain 110 is secured by a swivel 113 to a shackle or stirrup 114 which embraces a transverse rod 115 carried between a pair of transversely spaced brackets 116 rigidly bolted to and projecting rearwardly from the center housing of the tractor. The shackle 114 is relatively long and provides a degree of lost motion in the connection to permit substantial upward movement of the plow structure toward transport position before the chain 110 is drawn taut, thus insuring lifting of the operative plow unit clear of the furrow before the change-over action takes place.

Shifting of the chain-anchoring member 111 within the slot 112 in the actuator lever 101 upon initial tightening of the chain 110 disengages the locking detent 78 and releases the plow beam assembly for rotation. As will be seen by reference to Figs. 9 and 13 of the drawings, the member 111 is retained in the slot 112 by a flange or collar 117 on its projecting end. The member is yieldably urged toward the upper end of the slot 112 by a spring 118 (Fig. 9) acting on a plunger 119 slidably supported in a hollow boss 120 projecting from the rear face of the actuator 101. The plunger 119 is positioned so that its upper end underlies the anchoring member 111 while its lower end is positioned to engage the free end of the latch element 78. Accordingly as the plow structure is raised the lost motion in the chain 110 and shackle 114 is first taken up and then the anchoring member 111 is actuated to depress the plunger 119 and rock the detent element 78 out of the locking recess 77. Upon withdrawal of the detent element from the recess, the tension applied through the chain 110 will rock the actuator in that direction determined by the selecting mechanism to effect the change-over of the plow units.

The change-over movements of the plow beam assembly are transmitted to the coulter-supporting structure to adjust the coulter simultaneously. Thus, the bearing and locking element 62 is provided with a pair of rigid, laterally projecting fingers 121 (Figs. 8 and 14) positioned respectively to present arcuate anti-friction surfaces for engagement by abutment members 122 carried by and projecting laterally at opposite sides of the abutment block 95 of the coulter-supporting structure. The abutment members are preferably in the form of sturdy headed screws threaded into a forwardly projecting boss 124 integral with the block 95. To reduce friction and minimize wear, the screwheads are desirably rounded and finished with a smooth unbroken surface with flattened shank portions 125 adjacent the heads for engagement by a wrench or similar tool. With this arrangement the point of engagement of the fingers 121 with the abutment members and therefore the point at which the adjusting movement is imparted to the coulter structure may be regulated by screwing the members in or out. Lock nuts 126 are provided for locking the abutment members 122 in adjusted positions.

At will be seen in Figs. 14 and 15, left-hand abutment 122 will have moved left-hand finger 121 to its adjusted position as determined when left-hand screw 99 engages tube 65. In the position of Figs. 8, 14, and 15 base 40 is in the ground; left-hand finger 121 has acted against left-hand abutment 122 to move the upper portion of coulter support 95—87 to the right of the vertical centerline of the two-way plow (as seen in Figs. 14 and 15) about a pivot on the horizontal centerline formed by the shaft section 86 on the bearing plates 88 depending from the supporting tube 65; and the lower end of coulter support 95—87, and with it the coulter itself, is accordingly moved to the left of the vertical centerline. Thus, when base 40 is in the ground, the coulter is properly aligned with it. Looseness or play is avoided by having the engagements between fingers 121 and abutments 122 and between screws 99 and the tube occur simultaneously, this relation being maintained by detent 78 in a recess 77.

On the other hand, when the other plow 41 is in the ground, the coulter is shifted over on the opposite side of the vertical centerline. For the shift from ground engagement by the left-hand plow 41 to that by the right-hand plow 40, the shaft 60 and the segmental flange 75 rotate clockwise to move the right-hand finger 121 (as seen in Fig. 8) downward into engagement with right-hand abutment 122. Continued counter-clockwise movement moves the upper end of coulter support 95—87 to the left of the vertical centerline of the two-way plow until right-hand screw contacts supporting tube 65. Since the upper end of the coulter support is to the left of the vertical centerline, the lower end of the coulter support and the coulter itself are to the right of the vertical centerline. It is to be understood that generally in operation this vertical centerline will not be truly vertical, for the tractor will tilt somewhat sideways, because the wheels at one side of the tractor will be in the furrow, and the wheels at the other side, on unplowed ground.

Consider that the control parts for the two-way plow are in the position of Fig. 8. In this view the left-hand plow 40 (actually the right-hand one when a view looking forward of the tractor is considered, but Fig. 8 is taken in a rearward direction from the tractor) is in the ground and the right-hand plow 41 is raised. The abutment 104 on the segmental flange 75 is generally vertical and the abutment 105 is generally horizontal. The coil spring 102 extends downwardly from a lug 130 on the actuator 101 to a lug 131 on the coulter bracket 89 and causes the actuator 101 to be generally vertical. A groove 132 in the cam 103 and a plunger 134 slidable in a long bore or pocket 135 (Fig. 13) in the actuator 101 slidably urged by a spring 136 against the cam groove 132 cooperate to cock the actuator to an inclination to the right of the vertical and into engagement with the abutment 104. The actuator is inclined to the right in spite of a tilting of the tractor to the left due to one side of the tractor running in the furrow. Now, when the two-way plow is bodily raised with respect to the tractor through the links 22 and 23 and the power-operated crank acting through the links 24 on the links 23, the chain 110 and the shackle 114 swing to the right to a vertical position as soon as the top of the shackle or stirrup 114 is lifted from the transverse rod 115. Thus the engagement of the pin 114ª on the shackle 114 with the transverse rod 115 takes place near or at the right end of the rod 115, on a vertical line with the connection of the L-shaped member 111 with the actuator 101. As continued lifting of the two-way plow occurs, clockwise or right-hand movement of the actuator 101 is assured. Cocking of the actuator 101 to the right and a vertical position of the chain 110 connecting the actuator 101 with the shackle 114 (or of the line between the L-member 111 on the actuator 101 and the point of engagement between the shackle pin 114ª) assure an effective moment arm to the right. Downward pull on the chain 110 due to bodily lifting of the two-way plow with respect to the tractor causes the L-shaped member 111 to depress the plunger 119, which pivots the element 78 out of the recess 77 in the segmental flange 75. Now the actuator 101 and the flange 75 move clockwise to the position of Fig. 17. During this movement the right-hand plow 41 assists the movement since gravity tends to bring the plows 40 and 41 to the position of Fig. 17, in which the plows are balanced. Further movement to the position of Fig. 18, in which the right-hand plow 41 is in the ground and the left-hand plow 40 is completely raised, is accomplished by the chain 110 working against gravity. It is to be noted that the chain operates at a greater moment arm in the shift from Fig. 17 to Fig. 18, for the actuator 101 becomes increasingly horizontal, moving the chain out from the actuator pivot.

Figures 17, 19:
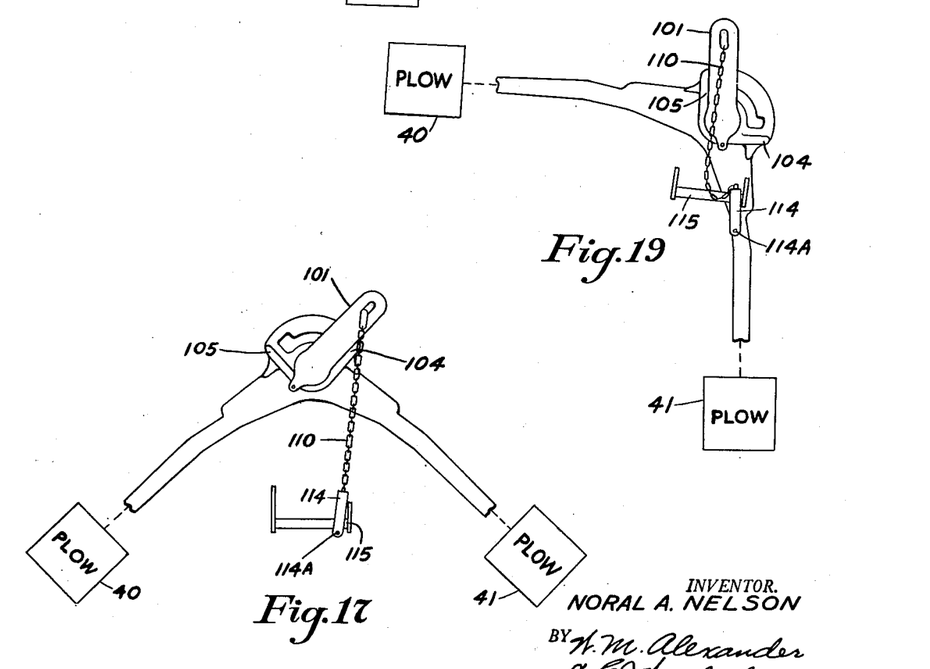
Figs. 17, 18, 19, and 20 are diagrammatic views of the plow in different positions.
Figures 18, 20:
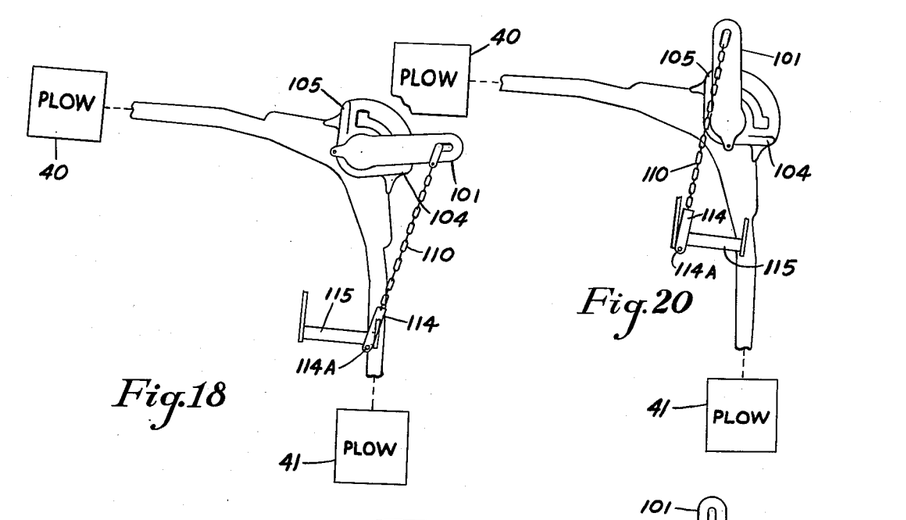

When the position of Fig. 18 is reached, the element 78 snaps into the recess 77 adjacent the abutment 105 in the segmental flange 75, the abutment 105 having reached an approximately vertical position. Now in spite of the fact that the operator reverses the hand lever 30 to lower the two-way plow bodily, gravity does not return the plows 40 and 41 to the balanced position of Fig. 18, since the positioning of the element 78 in the recess 77 at the abutment 105 locks the plows against movement with respect to the tube 65. Lowering of the two-way plow releases the pull of the chain 110 on the actuator 101, and the actuator now moves toward the vertical under the action of the spring 102. Actually, as shown in Fig. 19, the actuator moves somewhat beyond the vertical to a leftward inclination with engagement with the abutment 105 through action of the spring-urged plunger 134 in seeking the bottom of the groove 133 in the cam 103. The actuator 101 is tilted to the left in spite of a tilt of the tractor to the right due to one side of the tractor running in the furrow. The tilt of the tractor to the right is indicated by a rightward slope of the rod 115 in Fig. 19.

When it is desired to return the plows 40 and 41 to the position of Fig. 8, the two-way plow is again raised. When lifting has been sufficient to free the top of the stirrup or shackle 114 from the transverse rod 115, the chain 110 swings to a vertical position, and continued lifting brings the shackle pin 114a with the transverse rod 115 at or near its left end, as shown in Fig. 20. Thus pull by the chain 110 on the actuator 101 is certain to move the actuator 101 leftward or counter-clockwise, resulting eventually in positioning of parts as in Fig. 8, the right-hand plow 41 being raised and the left-hand plow 40 engaging the ground.

Hitch links 22 and 23 are connected to the tractor and to the two-way plow in such a way as to permit relative lateral shifting of the plow with respect to the tractor. This movement is limited by chains 144 connecting the rear of the tractor and the lower links 23, as shown in Figs. 1 and 2, and as disclosed more fully in Ferguson Patent 2,223,002, dated November 26, 1940. The transverse rod 115, which exerts pull on the stirrup 114 and the chain 110 so as to shift the actuator 101 and reverse the plows 40 and 41, assures that the movement of the actuator 101 will take place in the direction in which it is inclined, for because of the length of the rod 115 the end of the rod on the side toward which the actuator 101 is inclined will never move so far, with lateral shifting of the two-way plow, as to move the chain 110 through or beyond the pivot of the actuator 101.

The direction in which the actuator 101 is rocked to swing a plow unit into position for operation is determined by the selecting means including the spring 102 and the selector cam 103. The selector cam 103 cooperates with the spring 102 in swinging the actuator lever toward one or the other of the abutments 104—105 and acts to prevent accidental displacement of the actuator lever from its starting position due to the vibration or jolting of the implement. The spring 136 allows the cam 103 to retract and ride over the cam lobe between grooves 132 and 133 as the actuator lever is rocked from one position to the other and causes the plunger to seek the bottom of the cam groove presented thereto as the actuator lever approaches its limit positions. The cam grooves are shaped and spaced apart so that the actuator lever is securely held against the adjacent abutment and in position to be rocked in the proper direction in the next plow unit positioning cycle.

Cocking of the actuator 101 for movement in a predetermined direction is aided by the connection of the spring 102 to the lug 131 on the coulter bracket 89 carried by the supports 95—87. Thus, since, as previously described, the coulter support moves to the right or the left of the vertical centerline of the two-way plow, depending upon which plow is brought to ground engagement, the lower end of spring 102 will also move to right or left of the vertical centerline. When plow 41 engages the ground, the lower end of the spring 102 is to the left of the vertical centerline, and so the spring urges the actuator lug 106 to the left of the vertical line and the actuator 101 proper to the right of the vertical centerline. The actuator should be cocked to the right to insure movement to the right due to bodily lifting of the two-way plow for swinging plow 40 to the ground and plow 41 to elevated position. Conversely, when plow 40 engages the ground, the lower end of the spring 102 is to the right of the vertical centerline. This abets the cocking of the actuator lever to the left, by which it is enabled to move to the left for swinging plow 41 to the ground and plow 40 to elevated position.

Provision is made for rendering the selecting and actuating mechanism temporarily inactive without interfering in any way with the action of the lift mechanism when it is desired to utilize only one of the plow units. This is accomplished by securing the detent releasing plunger 119 in an operated or depressed position. Accordingly, upon return of the actuator lever 101 to starting position after a plow unit-positioning action, the end portion of the plunger will engage the side of the locking detent 78, as shown in Fig. 12, and thereby prevent the actuator lever from advancing to its usual over-center starting position with the plunger overlying the detent, as shown in Fig. 11. The actuator lever will therefore be rocked in the same direction each time the implement is raised to transport position and consequently there will be no change-over of the plow units. It will be appreciated of course that this lock-out action is effective irrespective of which of the plow units is set for operation.

As herein shown (Figs. 8, 9, 11 and 13), the means for securing the plunger 119 in operative position comprises an eccentric lock-out element 140 or cam nonrotatably fixed at one end of a shaft 141 supported for rotation and endwise movement in a bearing aperture adjacent the outer end of the actuator lever 101. The lock-out element is positioned above the upper end of the slot 112 in the actuator lever for coaction with the flange 117 and the chain-anchoring member 111 and is shaped to enable it to push the anchoring member downwardly in the slot and thus depress the plunger 119 when the element is turned to the active position in which it is shown in Fig. 13. When the lock-out element is turned to its normal inactive position (as shown in Fig. 8) the chain-anchoring element is freed for return to the outer end of the slot 112 by the action of the plunger-actuating spring 118.

For manipulation of the lock-out element the shaft 141 is provided at its forward end with a knob 142, whereby the shaft 141 may be rotated to shift the lock-out element to either the active or inactive position. To retain the element in either position it is provided with a forwardly projecting dowel pin 143 adapted to enter a recess 144 in the rear face of the actuator lever when the element is in the active position (see Figs. 12 and 13), and to engage the edge of the actuator lever when the element is in the inactive position (see Figs. 8 and 11). A coiled compression spring 145 interposed between the actuator lever and the knob 142 urges the shaft 141 and associated parts of the lock-out mechanism in a direction to enter the pin in the recess, and it is only necessary to push the knob inwardly to release the element for resetting.

While the actuator lever return spring 102 has been shown as anchored to the swinging coulter supporting structure, it will be understood that the coulter may be dispensed with if desired, retaining only so much of the structure as is required to effect the variable positioning of the spring anchorage point. Alternatively, the return spring 102 may be anchored to a stationary part of the plow structure leaving the final over-center shifting of the actuator lever 101 to the plunger-actuating spring 136. Under such conditions, the relative strengths of the two springs are proportioned so as to enable the spring 102 to swing the actuator lever and plunger 119 over the lobe of the cam 103 and the spring 136 acting through the plunger 119 and cam to carry the actuator lever into engagement with one or the other of the abutments 104—105.

I claim as my invention:

1. In an attachment for a tractor having pivotally supported upper and lower hitch links and power-operated means for the lower links, the combination comprising a housing adapted to be operatively connected with said links and movable thereby between a lowered or operating position and a raised transport position, a shaft supported in said housing for rotative movement and having one end projecting therefrom, a pair of soil-engaging tools supported on the projecting end of said shaft in circumferentially spaced relation, and mechanism operative in response to successive movements of said housing to transport position for rocking said shaft alternately in opposite directions to position first one tool and then the other for operation, said mechanism including a tension member connected between a stationary part of the tractor and a movable part of the mechanism.

2. In an attachment for a tractor having pivotally supported upper and lower hitch links and power-operated means for the lower links, the combination comprising a housing adapted to be operatively connected with said links and movable thereby between a lowered or operating position and a raised transport position, a shaft supported in said housing for rotative movement and having one end projecting therefrom, a pair of soil-engaging tools supported on the projecting end of said shaft in circumferentially spaced relation, actuating means supported on said housing and cooperating with said shaft to rotate it through an angle of 90 degrees to position the respective tools for operation individually, said actuating means being operable as an incident to the raising of said housing to the transport position, and selector means supported on said housing and positioned for operation by said actuating means for determining the direction of rotation of said shaft by said actuating means.

3. In an attachment for a tractor having pivotally supported upper and lower hitch links and power-operated means for the lower links, the combination comprising a housing adapted to be operatively connected with said links and movable thereby between a lowered or operating position and a raised transport position, a shaft supported in said housing for rotative movement and having one end projecting therefrom, a pair of soil-engaging tools supported on the projecting end of said shaft in circumferentially spaced relation, means operative to lock said shaft against rotation with either one of said tools disposed in an operative position and the other in an inactive position, and mechanism including a tension member anchored to a stationary part on the tractor operable in response to the raising of said housing to the transport position for initially releasing said locking means and then rocking said shaft to reverse the positions of said tools.

4. In an attachment for a tractor having pivotally supported upper and lower hitch links and power-operated means for the lower links, the combination comprising a housing adapted to be operatively connected with said links and movable thereby between a lowered or operating position and a raised transport position, a shaft supported in said housing for rotative movement and having one end projecting therefrom, a pair of soil-engaging tools supported on the projecting end of said shaft in circumferentially spaced relation, actuating means for rocking said shaft alternately in opposite directions to position said tools for alternate operation, and means providing a lost motion connection between said actuating means and a stationary part of the tractor for operating the actuating means in response to the movement of the housing to the transport position, the lost motion in said connection insuring lifting of the operative tool from soil-engaging position in advance of the operation of the actuating means.

5. In an attachment for a tractor having pivotally supported upper and lower hitch links and power-operated means for the lower links, the combination comprising a housing adapted to be operatively connected with said links and movable thereby between a lowered or operating position and a raised transport position, a shaft supported in said housing for rotative movement and having one end projecting therefrom, a pair of soil-engaging tools supported on the projecting end of said shaft in circumferentially spaced relation, an actuator lever supported in axial alinement with said shaft for limited rocking movement relative thereto, a flexible member providing a connection between said actuator lever and a stationary part of the tractor operative to rock the actuator lever alternately in opposite directions in response to successive raising actions of said power-operated means, and means providing an operative connection between said actuator lever and said shaft whereby said rocking movements are imparted to the shaft.

6. In an attachment for a tractor having pivotally supported upper and lower hitch links and power-operated means for the lower links, the combination comprising a housing adapted to be operatively connected with said links and movable thereby between a lowered or operating position and a raised transport position, a shaft supported in said housing for rotative movement and having one end projecting therefrom, a pair of soil-engaging tools supported on the projecting end of said shaft in circumferentially spaced relation, an actuator lever supported in axial alinement with said shaft for rocking movement relative thereto, abutment means for confining the relative rocking movement of the actuator lever and shaft within predetermined limits, spring means operative to rock said actuator lever to one limit position when said housing is in the operating position, and a flexible member connected between said actuator lever and a stationary part of the tractor for rocking the actuator lever to its other limit position in response to the raising of said housing to the transport position, said actuator lever being operative through said abutment means to rock said shaft in its movement to said other limit position, said shaft being locked against movement with said actuator lever as the latter is rocked by said spring means.

7. In a plow having right- and left-hand plow units supported in circumferentially spaced relation on a common plow beam, a housing supporting said beam for rotative movement whereby either plow unit may be positioned for operation, a rolling coulter, means for supporting said coulter on said housing for bodily swinging movement about an axis directly below and substantially parallel to the rotative axis of said beam, and means rigid with and rotatably with said beam coacting with abutment members on the coulter-supporting means for positively swinging the coulter between two different positions for operation with the respective plow units.

8. In a plow having right- and left-hand plow units supported in circumferentially spaced relation on a common plow beam, a housing supporting said beam for rotative movement whereby either plow unit may be positioned for operation, a rolling coulter, means for supporting said coulter on said housing for bodily swinging movement about an axis below and substantially parallel to the rotative axis of said beam, means for transmitting the rotative movements of said beam to said coulter-supporting means including a pair of members defining spaced abutments rigid with the supporting means, and a pair of spaced abutment-engaging elements rotatable with said beam.

9. In a plow having right- and left-hand plow units supported in circumferentially spaced relation on a common plow beam, a housing supporting said beam for rotative movement whereby either plow unit may be positioned for operation, a rolling coulter, means for supporting said coulter on said housing for bodily swinging movement about an axis below and substantially parallel to the rotative axis of said beam, means for transmitting the rotative movements of said beam to said coulter-supporting structure including coacting abutments and abutment-engaging elements on the supporting means and beam, and adjustable stop means defining the limit positions of the coulter-supporting means.

10. The combination in a plow structure having two plow units carried by a rotatably supported beam, actuating mechanism for the beam including an actuator lever supported for rocking movement about an axis coincident with the rotational axis of the beam, means rigid with the beam providing spaced abutments positioned on opposite sides of said actuator for engagement thereby, and means for rocking said actuator lever into engagement with said abutments alternately to position the plow units for operation individually.

11. In combination, a plow structure having a support, a beam rotatably mounted on the support, two plow units carried by the beam, actuating mechanism for the beam including an actuator lever supported for rocking movement about an axis coincident with the rotational axis of the beam, means associated with the beam and providing spaced abutments positioned on opposite sides of said actuator for engagement thereby, a spring connected at one end to said actuator lever and anchored to its other end to the plow structure yieldably urging the actuator lever toward a starting position, means for exerting a pull on said actuator lever to rock it away from the starting position, and means for shifting the anchorage point of said spring to determine the direction of movement of the actuator lever.

12. The combination in a two-way plow coupled to a tractor by a lift mechanism, a pair of plow units carried by a rotatably supported beam, means including a detent for locking said beam with either of said plow units in operating position, an actuator lever pivotally supported at one end of the beam, means for rocking said actuator lever to turn said beam including a flexible member connected at one end to a stationary part of the tractor, an anchoring member connecting the other end of said flexible member to the free end of said actuator lever, said anchoring member being movable longitudinally of the actuator lever by said flexible member upon operation of the tractor lift mechanism, and means operable by said anchoring member in such movement for shifting said detent to unlock the beam.

13. An implement for direct attachment to a tractor having power-operated hitch links operable to move the implement between working and transport positions, said implement including a pair of alternately operable plow units carried by a rotatably supported beam, actuating means for turning said beam to position the plow units for operation alternately including an actuator lever pivotally supported adjacent one end of said beam, means yieldably urging said actuator lever toward a starting position, means providing a connection between the free end of said actuator and a stationary part of the tractor operative to rock the actuator lever away from its starting position incident to the movement of the implement toward transport position, and abutment means associated with said beam and engageable by said actuator lever for transmitting the movements of the latter to said beam.

14. An implement for direct attachment to a tractor having power-operated hitch links operable to move the implement between working and transport positions, said implement including a pair of alternately operable plow units carried by a rotatably supported beam, actuating means for turning said beam to position the plow units for operation alternately including an actuator lever pivotally supported adjacent one end of said beam, means yieldably urging said actuator lever toward a starting position, means providing a connection between the free end of said actuator and a stationary part of the tractor operative to rock the actuator lever away from its starting position incident to the movement of the implement toward transport position, selector means operative to determine the direction of movement imparted to said actuator lever, and means for transmitting the movements of said actuator lever to said beam.

15. An implement for direct attachment to a tractor having power-operated hitch links operable to move the implement between working and transport positions, said implement including a pair of alternately operable plow units carried by a rotatably supported beam, actuating means for turning said beam to position the plow units for operation alternately including an actuator lever pivotally supported adjacent one end of said beam, means yieldably urging said actuator lever toward a starting position, means providing a connection between the free end of said actuator and a stationary part of the tractor operative to rock the actuator lever away from its starting position incident to the movement of the implement toward transport position, selector means controlling the direction of movement imparted to said actuator normally effective to cause such movements to alternate in either direction from said starting position, said selector means being settable to restrict the movement of the actuator lever to one direction from the starting position, and means for transmitting the movements of said actuator lever to said beam.

16. Agricultural apparatus adapted to be drawn by a tractor and to be shifted with respect thereto between an operating position and a transport position, said apparatus comprising a support, a carrier mounted on the support for rocking movement with respect thereto about an axis, soil-engaging devices angularly spaced from one another about the carrier axis and mounted on the carrier for conjoint angular movement with the carrier and one another, the carrier being locatable with respect to the support in one relative position involving an active condition of one of said devices and an inactive condition of another of said devices and another relative position involving an inactive condition of the said one device and an active condition of the said other device, an actuator movable with respect to the support in one direction from a general central position to rock the carrier in one direction from one of its positions to the other and in the opposite direction from the said other position to the said one position, means adapted to connect the tractor and the actuator for causing movement of the agricultural apparatus from operating position to transport position to make the actuator shift the carrier from one relative position to the other relative position, centering means acting in opposition to the means adapted to connect the tractor and the actuator to return the actuator to its general central position upon return of the apparatus to operative position, and biasing means acting upon the actuator in its general central position for causing successive movements of the actuator by the means adapted to connect the actuator and the tractor to be first in one direction and then in the opposite direction, whereby the soil-engaging devices are reversed as to active and inactive conditions with each movement of the apparatus from operative position to transport position.

17. Agricultural apparatus adapted to be drawn by a tractor and to be shifted with respect thereto between an operating position and a transport position, said apparatus comprising a support, a carrier mounted on the support for rocking movement with respect thereto about an axis extending in the general direction of movement of the tractor, soil-engaging devices angularly spaced substantially less than 180° from one another about the carrier axis and mounted on the carrier for conjoint angular movement with the carrier and one another, means for locking the carrier with respect to the support in one relative position involving an active condition of one of said devices and an inactive condition of another of said devices and another relative position involving an inactive condition of the said one device and an active condition of the said other device, an actuator movable with respect to the support in one direction from a general central position to rock the carrier in one direction from one of its positions to the other and in the opposite direction from the said other position to the said one position, means adapted to connect the tractor and the actuator for causing movement of the agricultural apparatus from operating position to transport position to release the locking means and to make the actuator shift the carrier from one relative position to the other relative position, centering means acting in opposition to the means adapted to connect the tractor and the actuator to return the actuator to its general central position upon return of the apparatus to operative position, and biasing means acting upon the actuator in its general central position for causing successive movements of the actuator by the means adapted to connect the actuator and the tractor to be first in one direction and then in the opposite direction, whereby the soil-engaging devices are reversed as to active and inactive conditions with each movement of the apparatus from operative position to transport position.

18. Agricultural apparatus adapted to be drawn by a tractor and to be lifted with respect thereto between an operating position and a transport position, said apparatus comprising a support, a carrier mounted on the support for rocking movement with respect thereto about an axis, soil-engaging devices angularly spaced from one another about the carrier axis and mounted on the carrier for conjoint angular movement with the carrier and one another, the carrier being locatable with respect to the support in one relative position involving an active condition of one of said devices and an inactive condition of another of said devices and another relative position involving an inactive condition of the said one device and an active condition of the said other device, an actuator pivoted with respect to the support so as to extend generally upwards from the pivot in a general central position and being movable in one direction from the general central position to rock the carrier in one direction from one of its positions to the other and in the opposite direction from the said other position to the said one position, means adapted to connect the tractor and the actuator for causing movement of the agricultural apparatus from operating position to transport position to make the actuator shift the carrier from one relative position to the other relative position, centering means acting in opposition to the means adapted to connect the tractor and the actuator to return the actuator to its general central position upon return of the apparatus to operative position, and biasing means acting upon the actuator in its general central position for causing successive movements of the actuator by the means adapted to connect the actuator and the tractor to be first in one direction and then in the opposite direction, whereby the soil-engaging devices are reversed as to active and inactive conditions with each movement of the apparatus from operative position to transport position, the point of application to the tractor of the connection between the tractor and the actuator being shiftable transversely of the pivot axis of the actuator, whereby the said connection insures movement of the actuator in the proper direction during lifting of the agricultural apparatus and the moment arm for lifting by the connection and the actuator is increased during the course of the lifting.

19. An attachment adapted to be drawn by a tractor and to be lifted with respect thereto between an operating position and a transport position, said attachment comprising a support, an implement mounted on the support for rocking movement through substantially less than 180° between angular positions involving two different working conditions, an actuator pivoted with respect to the support so as to extend generally upwards from the pivot in a general central position and being movable in one direction from the general central position to rock the implement in one direction from one working condition to the other and in the opposite direction from the general central position to rock the implement in the opposite direction from the said other working condition to the said one working condition, means associated with the actuator for connection to a portion of the tractor with respect to which the implement is lifted for causing lifting of the attachment from operating position to transport position to make the actuator shift the implement from one working condition to the other, centering means for returning the actuator to its general position upon return of the attachment to operative position, and biasing means acting upon the actuator to modify the general central position of the actuator for causing successive movements of the actuator by the tractor-connected means to be in opposite directions from the general central position, whereby the implement is reversed as to working conditions with each lifting of the attachment from operative position to transport position, the point of application to the said portion of the tractor of the actuator-associated means being shiftable transversely of the pivot axis of the actuator, whereby the actuator-associated means insures movement of the actuator in the direction for which it is conditioned by the biasing means and the moment arm for lifting through which the actuator and the actuator-associated means act is increased during the course of the lifting.

20. The attachment specified in claim 19, the rocking axis of the implement being generally in the direction of movement of the tractor, the actuator-associated means comprising a rod adapted for mounting on the tractor transversely to the direction of movement of the tractor and a shackle surrounding the rod and slidable therealong.

21. The attachment specified in claim 19, the rocking axis of the implement being generally in the direction of movement of the tractor, the actuator-associated means comprising a rod adapted for mounting on the tractor transversely to the direction of movement of the tractor, a stirrup having a length considerably greater than the thickness of the rod and receiving the rod, and flexible means extending from the stirrup to the actuator, the distance between the rod and the actuator in its general central position when the attachment is in working position being less than the combined length of the flexible means and the stirrup, whereby the attachment may have some movement in working position without involving the actuator in shifting the implement from one working condition to the other, and the length of the stirrup in relation to the thickness of the rod permitting the stirrup to shift along the rod and engage the same on a generally vertical line through the connection of the flexible means with the actuator, such shifting of the stirrup along the rod taking place after the upper end of the stirrup is raised from the rod and before the lower end of the stirrup is raised to the rod.

22. The attachment specified in claim 19 and further including locking means acting between the implement and the support to hold the implement in either working condition, the locking means being connected with the actuator and the actuator-associated means so as to be released upon lifting of the attachment to transport position for enabling the actuator to rock the implement from one working condition to the other.

23. An attachment adapted to be drawn by a tractor and to be moved with respect thereto between an operating position and a transport position, said attachment comprising a support, an implement mounted on the support for movement with respect thereto in opposite directions between angular positions involving two different working conditions, an actuator movable with respect to the support in one direction from a general central position to rock the implement from one working condition to the other and in the opposite direction to rock the implement from the said other working condition to the said one working condition, means associated with the actuator for connection to a portion of the tractor with respect to which the attachment moves during its movement from working position to transport position for causing the said movement to make the actuator shift the implement from one working condition to the other, centering means for returning the actuator to its general central position upon return of the attachment to operating position, and biasing means acting upon the actuator to modify the general central position of the actuator for causing successive movements of the actuator by the tractor-connected means to be in opposite directions from the general central position, whereby the implement is reversed as to working conditions with each movement of the attachment from operative position to transport position.

24. The attachment specified in claim 23 and further including locking means acting between the implement and the support to hold the implement in either working condition, the locking means being connected with the actuator-associated means so as to be released upon lifting of the attachment to transport position for enabling the actuator to rock the implement from one working condition to the other.

25. In combination, a plow structure having a support, a beam rotatably mounted on the support, two plow units carried by the beam, actuating mechanism for the beam including an actuator lever supported for rocking movement about an axis coincident with the rotational axis of the beam, means associated with the beam and providing spaced abutments positioned on opposite sides of said actuator for engagement thereby, each abutment being positionable adjacent the actuator lever in its starting position and the other abutment spaced from the lever depending on which plow unit is in operative position, a spring connected at one end to said actuator lever for yieldably urging the actuator lever toward the starting position, means for exerting a pull on said actuator lever to rock it away from the starting position against the adjacent abutment for moving the plow unit in inoperative position to operative position, means providing an anchorage for the other end of the spring, and means associating the plow beam and the last mentioned means for shifting the anchorage of the other end of the spring to urge the actuator lever toward the particular abutment to which the lever is adjacent in its starting position.

26. In combination, a support, a carrier rockably mounted on the support, a pair of circumferentially spaced tools mounted on the carrier, an actuator pivotally mounted on the support on the rocking axis of the carrier, a spring connected to the actuator for urging the actuator to a general central position, a pair of spaced abutments positioned on opposite sides of the actuator and associated with the tools, one abutment being adjacent and the other spaced from the actuator with one tool in operative position, the other abutment being adjacent and the one being spaced from the actuator with the other tool in operative position, a lever having a mid region associated with a portion of the support spaced from the rocking axis, an end farther from the rocking axis than the mid region and being generally on the same side of the rocking axis as the mid region, said end serving as an anchorage for the spring, and the other end located generally between the said region and the rocking axis, and means associated with the tools and coacting with the said other end of the lever to shift the anchorage of the spring for conditioning the actuator for movement toward the side on which the particular adjacent abutment lies.

NORAL A. NELSON.

REFERENCES CITED

The following references are of record in the file of this patent:

UNITED STATES PATENTS

| Number | Name | Date |
|---|---|---|
| 780,609 | Hoffert | Jan. 24, 1905 |
| 2,227,366 | Pridgen | Dec. 31, 1940 |
| 2,429,463 | Hurlimann | Oct. 21, 1947 |
| 2,543,786 | Lindeman | Mar. 6, 1951 |

FOREIGN PATENTS

| Number | Country | Date |
|---|---|---|
| 48,294 | Austria | June 10, 1911 |
| 747,489 | France | Mar. 28, 1933 |
| 875,681 | France | June 29, 1942 |
| 47,011 | Germany | May 10, 1889 |
| 236,949 | Switzerland | July 16, 1945 |
| 240,945 | Switzerland | June 17, 1946 |

OTHER REFERENCES

Publication RM-G-3214, "Two Way Plow" by Harry Ferguson, Inc., 2 pages, published before January 1, 1947.